(No Model.)
F. G. HURLBUT.
BICYCLE STAND.
No. 512,548. Patented Jan. 9, 1894.
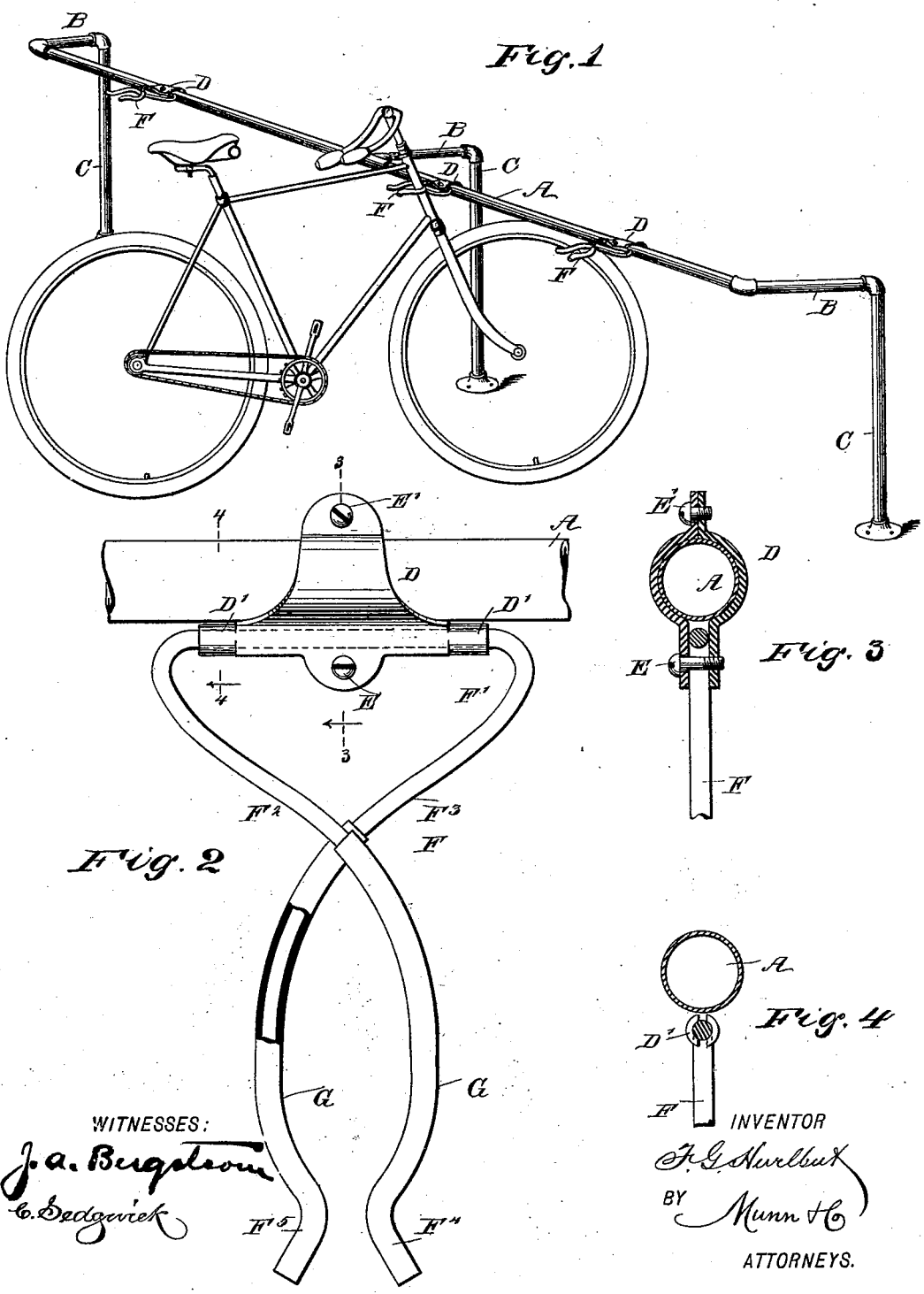

UNITED STATES PATENT OFFICE.

FRED G. HURLBUT, OF FOND DU LAC, WISCONSIN, ASSIGNOR TO WEEKS & HURLBUT, OF SAME PLACE.

BICYCLE-STAND.

SPECIFICATION forming part of Letters Patent No. 512,548, dated January 9, 1894.

Application filed April 14, 1893. Serial No. 470,278. (No model.)

*To all whom it may concern:*

Be it known that I, FRED G. HURLBUT, of Fond du Lac, in the county of Fond du Lac and State of Wisconsin, have invented a new and Improved Bicycle-Stand, of which the following is a full, clear, and exact description.

The object of the invention is to provide a new and improved bicycle stand which is simple and durable in construction, and arranged to securely hold a bicycle in place and to permit of its convenient removal whenever desired.

The invention consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a perspective view of the improvement as applied. Fig. 2 is an enlarged plan view of the improvement. Fig. 3 is a cross section of the same on the line 3—3 of Fig. 2; and Fig. 4 is a like view of the same on the line 4—4 of Fig. 2.

The improved bicycle stand is provided with a horizontally extending bar A supported on branch arms B projecting from the posts C secured to the floor in any suitable manner.

On the bar A, and suitable distances apart are arranged the clips D, each made of two plates fastened together in the front and rear of the bar A by the screws E and E', as is plainly shown in Figs. 2 and 3. On the front of the plates, and at the ends of the same, are formed the eyes D' for the middle part F' of a clamp F made of a single piece of spring metal and bent, after leaving the eyes D', to cross the two members $F^2$, $F^3$, to form a spring fork for engagement with the handle bar or head of the bicycle to hold the latter in place, as illustrated in Fig. 1. The front ends $F^4$ and $F^5$ of the crossed members $F^2$, $F^3$ respectively are bent outward to form a mouth for the convenient entrance of the head of the bicycle, and the two members are preferably covered by rubber tubing G or other soft material to prevent marring or other injury of the part engaged by the fork of the clamp F. The latter extends approximately forwardly and horizontally from the bar A, so that the operator can conveniently run the wheel forward to engage the head with the fork of the clamp F, the two members $F^2$, $F^3$ securely holding the head and thereby supporting the bicycle in an upright position. The bar A is located sufficiently high above the floor to permit the front bicycle wheel to pass under the bar, and to permit the fork to engage and grasp the head without danger of twisting the frame, or other part of the bicycle. A slight rearward pull on the bicycle readily disengages the head from the spring clamp. It is understood that the members $F^2$ and $F^3$ are crossed, to form at their intersection, a stop for the head entering the forks.

Having thus fully described my invention, I claim as new and desire to secure by Letters Patent—

1. A bicycle stand comprising the horizontal bar A, its vertical supports and a series of forwardly projecting spring clamps secured at intervals to the bar with their jaws adapted to receive the handle bar or head of a bicycle, substantially as set forth.

2. A bicycle clamp comprising the upper and lower semi-cylindrical plates D having apertured lugs through which pass the clamping bolts or screws E E', the eyes D' D' on the ends of the forward edges of said plates, and the spring clamp F formed of a single piece of wire and having a middle or cross bar F' clamped between said plates and their eyes and having arms $F^2$ $F^3$ crossed between their ends and bent at their outer ends as at $F^4$ $F^5$, substantially as set forth.

FRED G. HURLBUT.

Witnesses:
S. M. SMEAD,
S. BURTUS AMORY.